United States Patent [19]

Eiselen

[11] Patent Number: 5,004,578

[45] Date of Patent: Apr. 2, 1991

[54] PROCESS AND APPARATUS FOR PRODUCING HOLLOW BODIES OF THERMOPLASTIC MATERIAL

[75] Inventor: Otto Eiselen, Königswinter, Fed. Rep. of Germany

[73] Assignee: Drupp Kautex Maschinenbau GmbH, Bonn, Fed. Rep. of Germany

[21] Appl. No.: 375,167

[22] Filed: Jun. 30, 1989

[30] Foreign Application Priority Data

Jul. 4, 1988 [DE] Fed. Rep. of Germany ....... 3822524

[51] Int. Cl.$^5$ .................... B29C 49/04; B29C 49/22
[52] U.S. Cl. ................... 264/514; 264/515; 264/541; 264/173; 425/133.1; 425/380; 425/381; 425/462; 425/466; 425/532
[58] Field of Search ............... 264/173, 514, 515, 541; 425/133.1, 131.1, 462, 466, 467, 381, 380, 532

[56] References Cited

U.S. PATENT DOCUMENTS

| | | | |
|---|---|---|---|
| 3,611,494 | 10/1971 | Feuerherm | 425/380 |
| 3,985,490 | 10/1976 | Kader | 425/466 |
| 4,422,838 | 12/1983 | Iwawaki et al. | 425/381 |
| 4,548,569 | 10/1985 | Pitigliano et al. | 425/133.1 |
| 4,565,515 | 1/1986 | Maier | 425/462 |
| 4,758,144 | 7/1988 | Becker | 425/462 |
| 4,874,305 | 10/1989 | McGill et al. | 425/131.1 |

FOREIGN PATENT DOCUMENTS

| | | | |
|---|---|---|---|
| 2639665 | 3/1978 | Fed. Rep. of Germany | 425/380 |
| 2712910 | 9/1978 | Fed. Rep. of Germany | 425/133.1 |
| 3026822 | 1/1982 | Fed. Rep. of Germany | 425/380 |
| 3623308 | 1/1988 | Fed. Rep. of Germany | 425/133.1 |
| 88-02689 | 4/1988 | World Int. Prop. O. | 425/131.1 |

Primary Examiner—Jeffery Thurlow
Attorney, Agent, or Firm—Panitch, Schwarze, Jacobs & Nadel

[57] ABSTRACT

The invention concerns a process and an apparatus for the production of hollow bodies from thermoplastic material, the wall of which is in the form of a laminate, by extrusion blow molding. Tubular preforms for making the hollow bodies are first produced in an intermittent mode of operation, the wall thereof also being in the form of a laminate which includes a suitable number of layers. Within an extrusion head having an annular storage chamber for receiving the laminate-formation preform and an annular piston for emptying the storage chamber, the flows of material for forming the layers of the laminate of the preform are passed through the annular piston into the storage chamber in which they combine to form the laminate. The width of the outlets at which the flows of material issue from the annular piston can be so selected that it is proportional to the thickness of the respective layers to be formed therefrom in the laminate produced in the storage chamber.

12 Claims, 5 Drawing Sheets

PROCESS AND APPARATUS FOR PRODUCING HOLLOW BODIES OF THERMOPLASTIC MATERIAL

BACKGROUND OF THE INVENTION

The present invention relates generally to a process and an apparatus for the production of hollow bodies from thermoplastic material, the wall of which is in the form of a laminate, by means of extrusion blow molding.

In a process for producing a hollow body from thermoplastic material with a wall in the form of a laminate comprising a plurality of interconnected layers of at least first and second plastic materials of different natures, tubular preforms, the wall of which has a suitable number of layers, are first produced in a batch-wise manner using an extrusion unit comprising at least first and second extruders and a common extrusion head which is provided with an annular storage space or chamber for the laminate, an annular piston for emptying the storage space or chamber and an extrusion opening through which the preforms are extruded. All the flows of material which pass into the extrusion head and from which the individual layers of the laminate structure are formed are passed through the annular piston and are brought therein into the cross-sectional shape of a ring. It will be seen therefore that all the flows of material are already combined together to form the final laminate from which the wall of each hollow body is to be produced, within the annular piston of the extrusion unit. Thereupon, the final laminate which is formed in that way flows towards the storage chamber or space through an annular duct portion in the annular piston, that duct portion being enlarged in a funnel-like configuration in the direction of flow of the material. In the region of the annular piston in which the individual layers are combined to form the final laminate, the latter is of a thickness, that is to say a radial dimension, which is substantially less than the radial dimension or width of the storage space or chamber. That difference can be bridged by the conically enlarging duct portion in the annular piston so that at the mouth opening of the duct the final laminate is of approximately the same radial dimension as the storage-chamber.

It will be noted at this point however that that operating procedure which involves the individual flows of material being brought together to form the final laminate structure at a location at which the laminate structure is of only small thickness in comparison with the width of the storage chamber in order then to be adjusted within the piston to a thickness which approximately corresponds to the width of the storage chamber presupposes the use of an extrusion head which must be very long as the piston must be of a corresponding length in order for the process to be performed in that way. In addition, a laminate-formation location of small radial dimension, that is to say with the laminate being of small thickness at the moment at which it is formed, means that the individual flows of material which are combined together at that location to form the laminate must be moving at a correspondingly high rate, with the result that differences in flow rate as between the individual flows of material, at the moment at which the laminate is formed therefrom, are of corresponding magnitude, for the relative thicknesses of the respective layers of the laminate structure derive from the flows of material occurring under suitable conditions in that respect, that is to say, when there are substantial differences in thickness between the individual layers, greatly different flow rates are involved.

SUMMARY OF THE INVENTION

An object of the present invention is to provide a process for producing hollow bodies from thermoplastic material by extrusion blow molding, which does not seriously suffer from disadvantages of the above-discussed process.

Another object of the present invention is to provide a process for the production of a hollow body by extrusion blow molding, which is such as to provide a final laminate for forming the hollow body, which is of as uniform a structure as possible and which is as free from faults as possible.

Still another object of the present invention is to provide an apparatus for the production of hollow bodies by extrusion blow molding, involving the production of a laminate structure for forming the wall of the hollow body, with the extrusion head being of minimum structural length.

In accordance with the present invention these and other objects are achieved by a process for producing hollow bodies from thermoplastic materials, the wall of which is in the form of a laminate comprising a plurality of interconnected layers of at least first and second plastic materials of different natures, by means of extrusion blow molding, wherein tubular preforms, the wall of each of which has a suitable number of layers, are produced in a batch-wise manner by means of an extrusion unit comprising at least first and second extruders and a common extrusion head having an annular storage chamber for the laminate material, an annular piston for emptying the material from the storage chamber and an extrusion opening for extrusion of the material. All flows of material passing into the extrusion head, for forming the individual layers of the laminate structure, are passed through the annular piston in which they are put into the cross-sectional shape of a ring. The flows of material of annular cross-section, which leave the annular piston at its end towards the extrusion opening, flow individually out of the annular piston into the storage chamber and thus combine therein to form the laminate structure.

The operating procedure in that respect is desirably such that the flows of material issue from the annular piston at the end thereof so that those flows of material which are to form the outer and inner layers of the laminate come into contact with the outer and inner boundary walls respectively of the storage chamber, only at the moment at which laminate formation occurs. That procedure can provide that, after the stored final laminate structure has been formed, it does not perform any substantial movement relative to the wall of the storage chamber, before the subsequent stroke movement of the piston for emptying the storage chamber of the laminate. That promotes uniformity of formation of the laminate structure. In addition, the fact that the laminate is formed in the storage chamber, with the width of the laminate-formation region being of a suitable dimension, means that the annular piston does not have to have a special duct portion within which the laminate is adjusted, in the direction of flow thereof, to the radial extent or dimension of the storage chamber.

Thus in accordance with a further preferred feature of the invention it is possible for the radial extent of the region in which the laminate is formed approximately to correspond to the radial extent of the storage chamber. In other words, the totality of the flows of material leaving the annular piston at its end towards the extrusion opening of the extrusion head, on passing into the storage chamber, is of a radial extent which at least approximately corresponds to the radial extent of the storage chamber. A procedure of that kind has the advantage that the laminate is generally at its greatest thickness at the moment at which it is formed and essentially only undergoes a reduction in thickness in the course of further operations to form it into the preform. That phase represents a stretching operation which is always clearly defined. In contrast, an increase in the thickness of a laminate requires an expansion or upsetting operation or involves the use of expansion or upsetting flows, in relation to which there is the risk of the laminate with its layers of different kinds being adversely affected. That problem always arises so that the endeavour is to carry out the necessary shaping operations within the extrusion head, in the form of operations for reducing the thickness of the laminate or stretching same.

The above-described form of the process in which the radial extent of the laminate-formation region at least approximately corresponds to the radial extent of the storage chamber is subject to limitations insofar as account must also be taken of the strength of the separating wall portions between the individual annular passages or ducts within the piston, and also the strength of the outer and inner walls of the piston structure. A very substantial approximation to the above-indicated condition and relationship between the radial extent of the laminate-formation region and the radial extent of the storage chamber is normally achieved by the flows of material, directly prior to leaving the annular piston at the end thereof which is towards the extrusion head, experiencing radial enlargement in such a way that, in the region in which the flows of material issue from the annular piston, they are only separated from each other by narrow spaces therebetween, which are formed by the separating wall portions within the piston structure.

In regard to the quality of the laminate to be formed and in particular the uniformity thereof in regard to distribution and positioning of the individual layers as well as regularity of thickness thereof, the rate of flow of the individual flows of material in the laminate-formation region is also an aspect of considerable significance. The rates at which the individual layers come together and are joined together in the laminate-formation region should approximate to each other as closely as possible and preferably should not substantially differ from each other. At the least, the differences between the rates of flow of the individual flows of material more particularly in the laminate-formation region should be as small as possible. In the light of that requirement, a preferred feature of the invention provides that the thickness, that is to say the radial dimension of the flows of material leaving the piston, is at least substantially proportional to the thickness of the layers to be formed therefrom, in the laminate stored in the storage chamber.

In many cases hollow bodies and more particularly containers and vessels which are produced by an extrusion blow molding process are of a multi-layer construction so that the wall of the hollow body will satisfy different requirements which cannot be satisfactorily met by using a wall made of a single plastic material. An example of that is a fuel tank which on the one hand must be of sufficient mechanical strength without however the fuel being capable of diffusing through the wall of the tank to a substantial degree. The properties of the material, which are relevant to the aspect of mechanical strength, while simultaneously taking account of economic requirements at the present time are best met by using plastic materials which belong to the polyolefin group. However polyethylene which is used in many situations of that nature suffers from the disadvantage that it allows fuel to diffuse therethrough. For that reason the wall of a fuel tank may be provided with a diffusion barrier layer in the form of a layer for example of polyamide. As however a layer of polyethylene on the one hand and a layer of polyamide on the other hand scarcely bond securely together, it is necessary to provide a bonding layer between the polyethylene and the polyamide layers. The material of the bonding layer forms a sufficiently strong bonding connection both with for example polyethylene and also polyamide and the function thereof is essentially only to join the two layers together in a sufficiently firm and strong fashion.

Depending on the respective requirements involved and the functions to be attributed to the individual layers of the laminate structure, a final laminate of that kind may comprise for example seven and more layers, while the individual layers may once again be of different thicknesses in dependence on the function they are to perform and the nature of the material forming them. Thus, in the above-mentioned example of a fuel tank the layer or layers or polyolefin material will be substantially thicker than the barrier layer or layers which are intended to prevent fuel from diffusing through the wall of the fuel tank and the boding layer or layers, both the barrier layer or layers and the bonding layer or layers comprising materials which are substantially more costly than for example polyethylene which is used in many cases for the support layer or layers of the wall, which provide mechanical strength.

Previous processes do not take adequate account of the situation as outlined above, it frequently being assumed that all layers in the final laminate structure are of the same thickness. That is an unrealistic view at least in regard to the majority of practical uses of hollow bodies with a multi-layer wall as, for the reasons specified above, a laminate in which the layers do not differ from each other in thickness or differ only slightly frequently cannot be used in a practical situation, even if only for reasons of economy.

If the flows of material leaving the annular piston are of aproximately equal cross-sections at the moment at which they pass into the storage chamber, then it is only possible to provide different thicknesses in respect of the layers forming the laminate, by virtue of the individual flows of material issuing from the annular piston at different rates, with the differences in flow rate, on the above-indicated assumption, approximately corresponding to the differences in the thicknesses of the respective layers. As the differences in regard to thickness of the individual layers may be very substantial, for example they may be in a relationship of more than 10:1 to each other, the differences in rate of flow as between the individual flows of material would be of a corresponding magnitude at the location at which the laminate structure is formed. In that situation it is scarcely possible to form a laminate which can satisfy high levels of requirement in regard to quality.

A further preferred feature of the invention therefore provides that the thicknesses of the flows of material in the laminate-formation region are made at least approximately proportional to the thicknesses of the individual layers formed by the flows of material in the final laminate. That procedure is of particular significance in regard to the production of high-quality hollow bodies.

As in many cases the layers of the hollow body which are not required to perform a load-carrying function can be very thin and for example may possibly only need to be a fraction of a millimeter in thickness, it will normally be necessary for the thickness of the layers in the region at which the flows of material issue from the annular piston to be greater than in the laminate to be formed in the storage chamber as it is scarcely possible to produce ducts of such a small radial dimension, for reasons concerned with the production procedure thereof. However that is not such a serious disadvantage as the choice of overall larger thicknesses in respect of the layers in that region involves a reduction in the absolute flow rate of the materials concerned so that any differences in flow rate which may be present are in any case of lesser significance. At any event the operating conditions involved are many times better than when dealing with a thin laminate-formation region as the difficulties involved in the production procedure for attaining suitably adapted dimensions in the structure of the annular piston are correspondingly reduced.

The fact that the final laminate which is formed in the storage chamber is generally of substantially greater thickness than the wall of the hollow body to be produced therefrom is an advantage. The procedure for reducing the thickness of the laminate structure to the thickness of the wall of the hollow body is normally carried out in a plurality of steps. Thus, the laminate undergoes a considerable reduction in thickness when it passes through the annular extrusion opening of the extrusion head. In addition, the laminate forming the wall of the preform which is extruded through the extrusion opening normally undergoes a further reduction in thickness if the preform is expanded to form the blow-molded product within a blow mold by an increased internal pressure.

Depending on the respective requirements or conditions concerned, it may be advantageous for at least two sub-flows of material to be combined in the piston to form a pre-laminate which then issues from the annular piston in the form of a single flow of material, to pass into the storage chamber. In other words the flows of material which can issue from the piston at the free end thereof, which is towards the storage chamber, may in turn already consist of two or more layers which together form a coherent flow of material. The requirement for two or more sub-flows of material to be combined together to form a single flow of material which represents the pre-laminate may arise for example from the fact that the space available in the cross-section of the annular piston structure is not adequate to provide a respective duct system which can lead to the free end of the annular piston, for each of the individual flows of material passing through the piston. Desirably, the operation of forming the pre-laminate is carried out with materials which are the same or similar and/or the flows of which do not substantially differ from each other. A pre-laminate of that kind may be advantageously used for the production of laminate layers in which the confluence lines which result from formation of the tubular structure from the flows of material are to be in mutually displaced relationship in order to provide that each such line only passes through a part of the thickness of each layer forming a pre-laminate. A pre-laminate of that kind is generally made from the same material or a material of the same type, with the respective flows of material advantageously being of the same thickness. In addition it is desirable for example for the flow of material for a barrier layer and also the two flows of material for the bonding layers which are used in that laminate structure to be combined together to form a pre-laminate. All three layers thereof are usually of approximately the same thickness. That means that the respective flows of material are brought together at substantially the same flow rates. Since, as already mentioned, the above-indicated layers may be very thin, the fact of producing the pre-laminate means that it is possible to achieve a layer thickness which results in more advantageous conditions in regard to introducing the pre-laminate into the storage chamber, for the operation of forming the final laminate structure.

In another aspect of the invention, there is provided an apparatus for producing hollow bodies from plastic material, the wall of which is in the form of a laminate comprising a plurality of interconnected layers of at least first and second plastic materials of different natures, by means of extrusion blow molding. The apparatus comprises an extrusion unit having at least first and second extruders and a common extrusion head with a storage chamber for the laminate, an annular piston for discharge of the laminate from the storage chamber and an annular extrusion opening from which the preform formed in the operation of emptying the storage chamber issues. Disposed within the annular piston are duct systems connected at one end to at least one feed conduit for plastic material and which are extended within the annular piston, in the direction of flow of material therethrough, in the form of a duct portion of annular cross-section which, at the end of the annular piston towards the extrusion opening, communicates by way of an annular outlet with the storage chamber. The outlets for the flows of material, at the end of the annular piston, open separately from each other into the storage chamber.

In a preferred feature of the apparatus according to the invention, the number of feed conduits for the duct system may be the same as the number of outlets which open separately from each other into the storage chamber. In an alternative feature however it is also possible for the number of feed conduits to be less than the number of separate outlets into the storage chamber, if at least one of the flows of material supplied to the assembly by the at least one feed conduit is divided, or the number of feed conduits may be larger than the number of separate outlets, if a pre-laminate is formed from at least two flows of material which are supplied through the feed conduit or conduits. It should be appreciated that those features may also be used simultaneously, giving rise to the situation that the number of feed conduits for the duct system is the same as the number of outlets which open separately from each other into the storage chamber.

In another advantageous feature of the invention, the radial extent of the region within which the outlets are disposed at the end face of the piston which is towards the storage chamber approximately corresponds to the radial width of the storage chamber.

Moreover, in another preferred feature of the invention, the individual outlets, in the region of their openings into the storage chamber, may be of a width which is substantially proportional to the thickness of the layers in the laminate which are formed from the flows of material respectively issuing from the outlets at the end face of the piston.

So that, when changing over from the production of one kind of hollow body to the production of another kind of hollow body, the extrusion head can be quickly and easily adapted to the different distribution of thicknesses of the layers in the preform formed in that way, it may be desirable for the end portion of the annular piston, which is towards the storage chamber and which contains the outlets of the duct system, to be mounted interchangeably on the piston in order thereby to permit the apparatus to be quickly converted to different thicknesses of layers and thus different duct systems which in the region of their outlets are proportional in respect of width thereto.

Further objects, features and advantages of the present invention will be apparent from the following description of preferred embodiments thereof.

DESCRIPTION OF PREFERRED EMBODIMENTS

Figure 1:
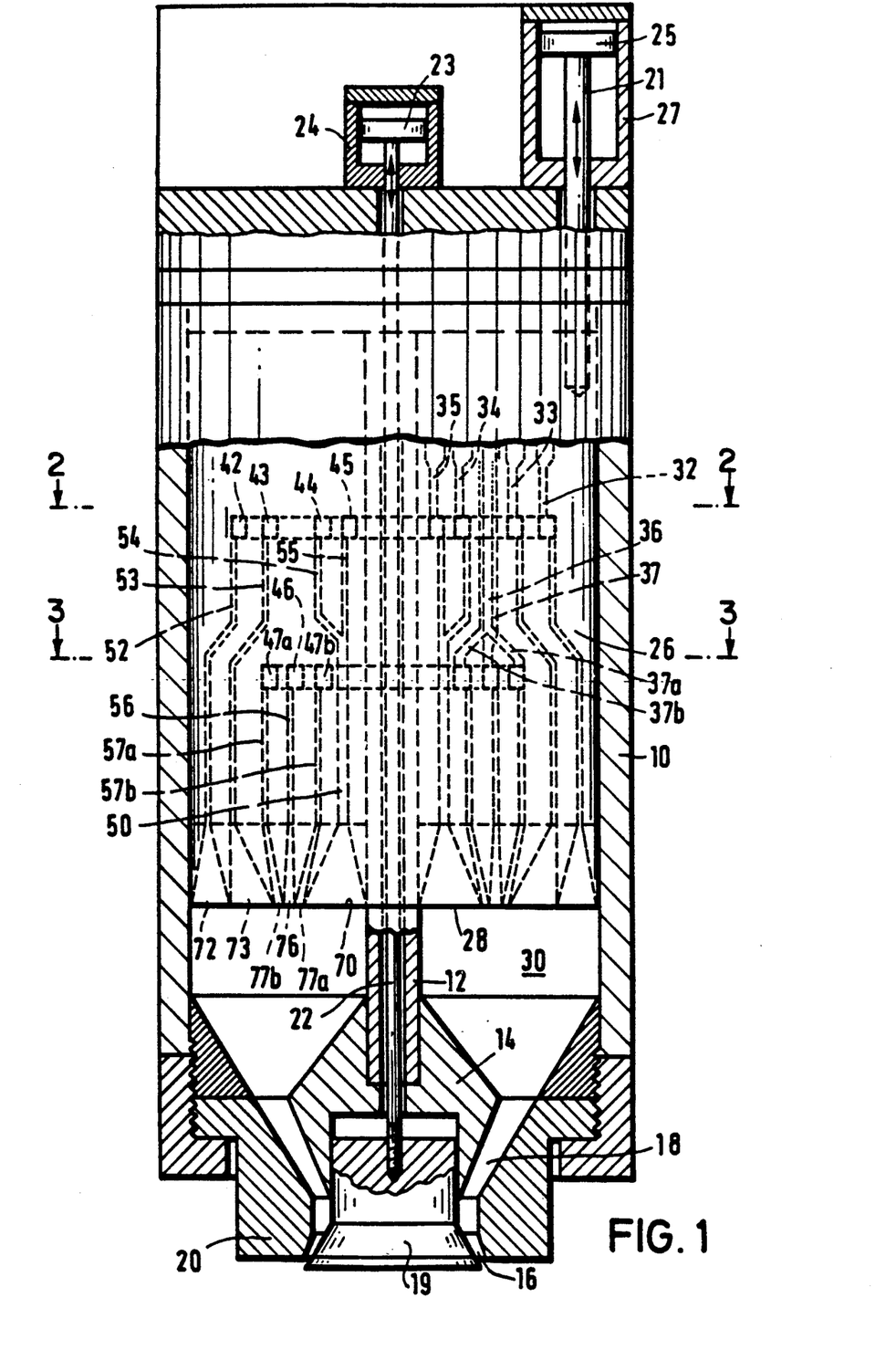
FIG. 1 is a partly sectional diagrammatic side view of an extrusion head having an annular piston in its position with the storage chamber full.

Referring firstly to FIGS. 1 through 5, illustrated therein is an extrusion head of an embodiment of an apparatus in accordance with the principles of the present invention, which in the usual way comprises a housing as indicated generally at 10, within which is arranged a mandrel 12 which is in coaxial relationship therewith. At its lower end in FIG. 1 the mandrel 12 carries an adaptor member 14 which delimits on the inward side an annular passage 18 which leads to an annular extrusion opening 16. Guided within the member 14 is a nozzle core member 19 which, in conjunction with a nozzle ring 20 disposed around same, defines the extrusion opening 16. The nozzle core member 19 is carried by a bar 22 which is disposed within the mandrel 12 and which at its end remote from the extrusion opening 16 is connected to a piston 23 of a hydraulic piston-cylinder unit 24. By suitable actuation of the piston 23 of the piston-cylinder unit 24, the nozzle core member 19 can be moved axially upwardly and downwardly as viewing FIG. 1 in order to vary the width of the annular extrusion opening 16. That can be effected in the usual way, by the mutually oppositely disposed surfaces of the nozzle core member 19 and the nozzle ring 20 disposed around same being of a tapering configuration as shown in FIG. 1.

An annular piston 26 is arranged for axial reciprocating movement within the housing 10. The annular piston 26 is connected at its end remote from the extrusion opening 16 to the piston rod 21 of a piston 25 which is displaceable in the cylinder 27 of a hydraulic piston-cylinder unit. It would be possible to provide a plurality of such piston-cylinder units 25 and 27, although only one thereof is illustrated in the drawing. It is also possible to provide only one piston-cylinder unit which would then preferably be so arranged that it acts on the annular piston 26 in symmetrical relationship therewith.

Figure 4:
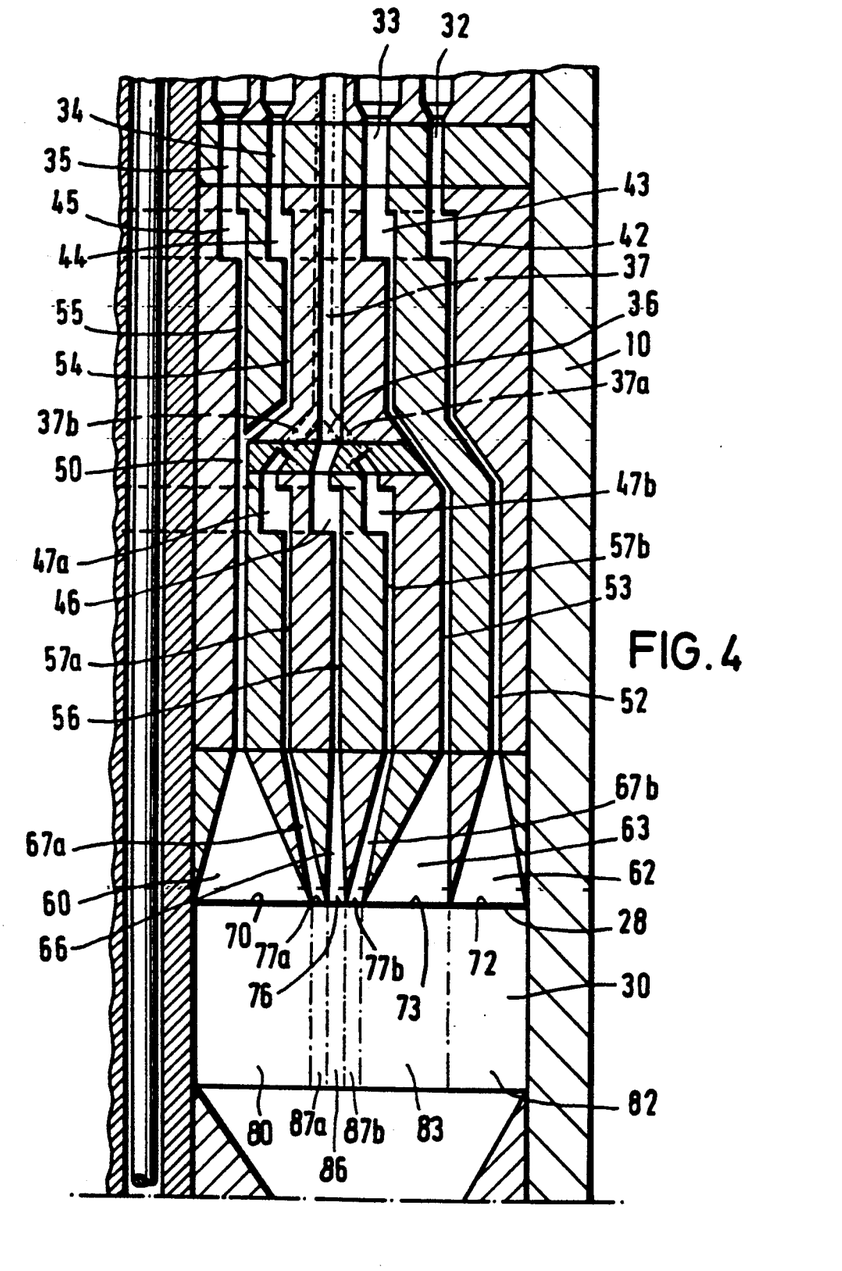
FIG. 4 is a view in longitudinal section and on a larger scale of a portion from FIG. 1.
Figure 5:
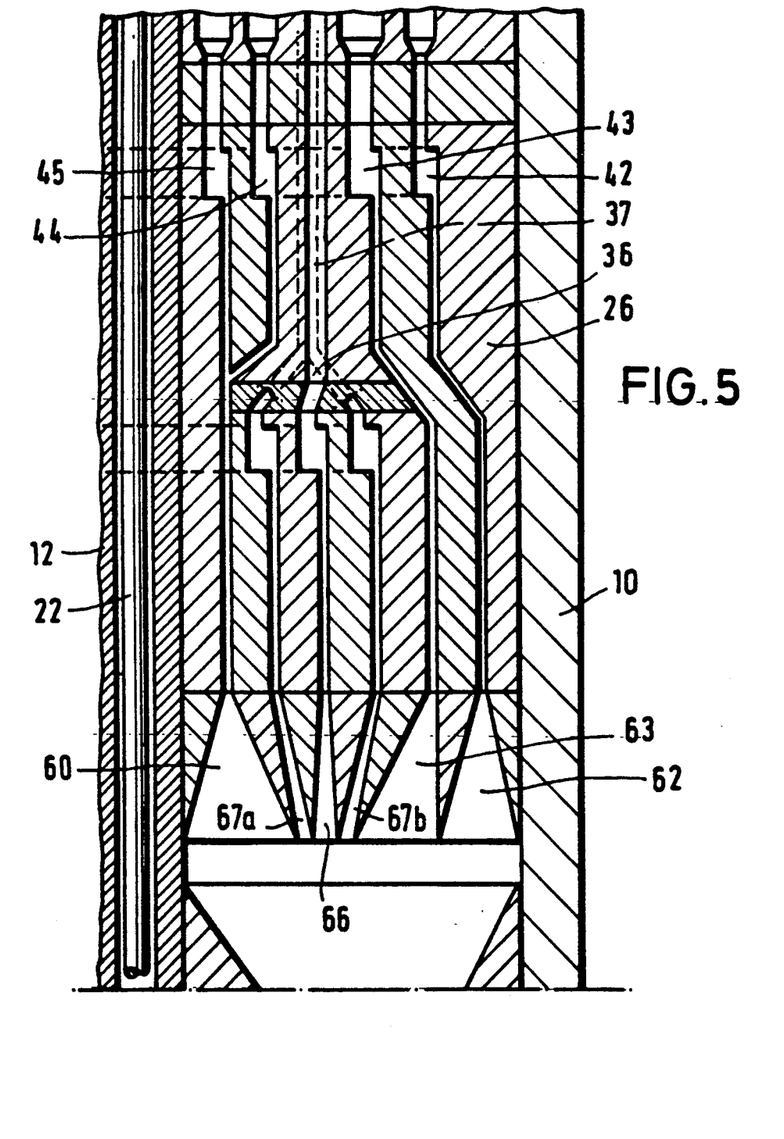
FIG. 5 is a view corresponding to that shown in FIG. 4 but illustrating the annular piston in the position that it adopts when the storage chamber is emptied.

In FIGS. 1 and 4 the annular piston 26 is shown in its upper limit position in which its end face 28 which is towards the extrusion opening 16 defines the upper limit of a storage chamber 30 provided in the housing 10 in the region between the end face 28 of the piston 26 and the member 14. FIG. 5 shows the annular piston 26 in its lower limit position into which it is moved by actuation of the piston-cylinder units 25 and 27. The chamber 30 can also be referred to as an accumulator chamber for reasons that will be apparent hereinafter.

The extrusion head is connected to six extruders (not shown), each of which discharges a respective thermoplastic material or other material with the same properties in regard to workability, into the extrusion head. The extruders are suitably connected to duct systems provided within the annular piston 26. The way in which the connection is specifically made is not part of the subject-matter of the present invention and will therefore not be described in greater detail herein. For example, the connection between the outlet openings of the respective extruders and the duct systems provided within the annular piston may be made in the manner described in German laid-open application (DE-OS) No. 36 35 334 while other possible forms of such a connection are described for example in German published application (DE-AS) No. 21 61 356, or German specifications Nos. 26 39 665 and 30 26 882, to which reference is accordingly hereby directed as incorporating the disclosure thereof.

Each of the flows of material coming from the respective extruders passes within the piston 26 into a respective feed duct 32, 33, 34, 35, 36 and 37 of substantially circular cross-section. The feed ducts are arranged to extend substantially parallel to the longitudinal axis of the extrusion head. The feed ducts 32, 33, 34 and 35 which are arranged on one radius of the annular piston, as can be clearly seen from FIG. 2, open into annular distributor ducts 42, 43, 44 and 45 respectively which are arranged coaxially with respect to the longitudinal center line of the extrusion head and at radial spacings from each other and which extend around the structure of the annular piston 26 in a common plane which is normal to the longitudinal axis of the extrusion head. The further feed duct 36 which is disposed on the same radius as the above-mentioned feed ducts 32, 33, 34 and 35 communicates with an annular distributor passage 46 which within the annular piston 26 extends around same in a plane which is normal to the longitudinal axis of the extrusion head and which is disposed at a smaller spacing from the free end face 28 of the annular piston, than the distributor ducts 42, 43, 44 and 45. The relationship between those ducts can be clearly seen from FIG. 1 in the left-hand part thereof.

Figure 2:
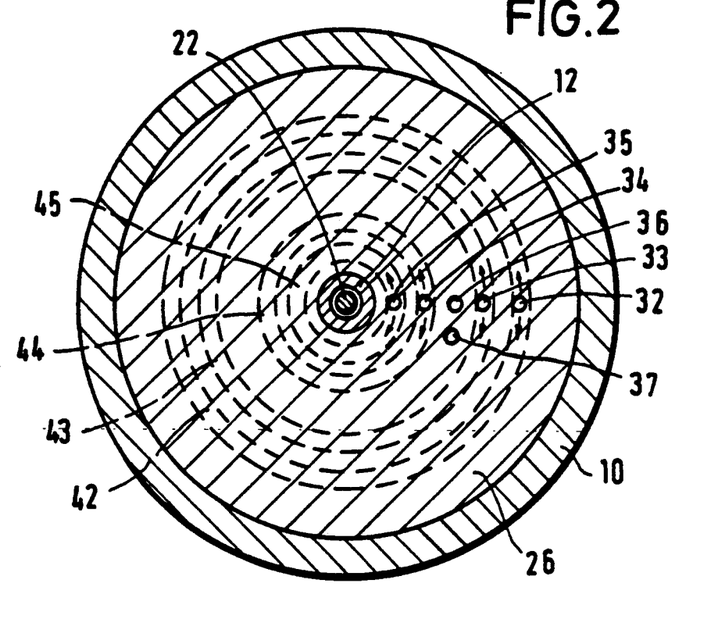
FIG. 2 is a view in section taken along line II—II in FIG. 1.
Figure 3:
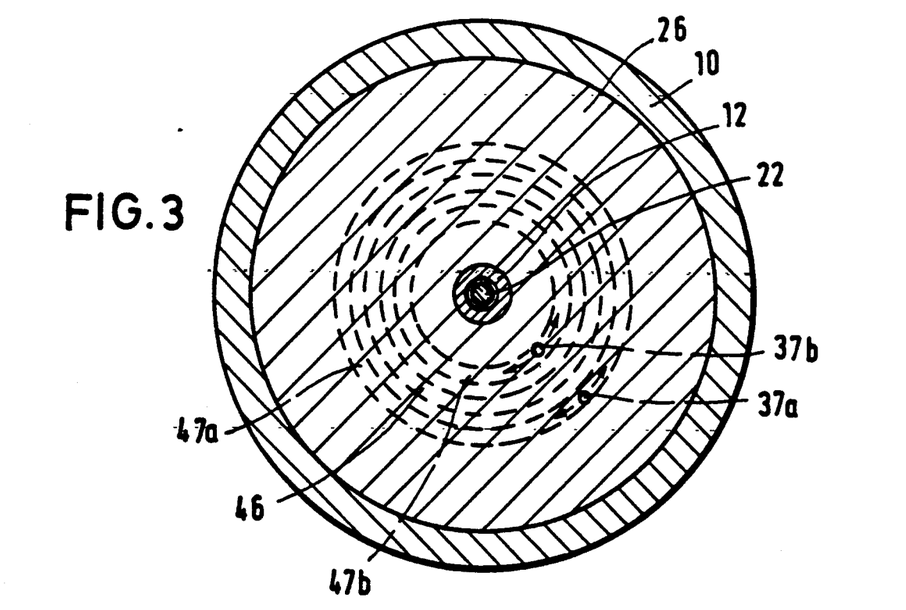
FIG. 3 is a view in section taken along line III—III in FIG. 1.

The feed duct 37 which is arranged in displaced relationship with the other feed ducts in the circumferential direction of the cross-section of the extrusion head, as clearly shown in FIG. 2, is continued in the form of two connecting ducts 37a and 37b which each communicate with a respective annular distributor duct 47a and 47b.

The annular distributor ducts 47a and 47b are disposed in the same plane as the annular distributor duct 46.

The annular piston 26 therefore includes a total of seven annular distributor ducts which, for reasons of space, are arranged in two planes which are at an axial spacing from each other. In the distributor ducts, the respective flows of material which are fed thereto in the form of a closed (i.e. solid) strand or extrusion through the feed ducts which are preferably of circular cross-section are each converted into a flow of material which is of annular cross-section.

Each of the distributor ducts 42, 43, 44, 45, 46, 47a and 47b communicates with a respective annular duct 52, 53, 54, 55, 56, 57a and 57b. All the annular ducts, with the exception of the annular ducts 54 and 55, communicate with the storage chamber 30 at the free end face 28 of the annular piston 26. The annular ducts 54 and 55 communicate with an annular collecting duct indicated at 50 so that the flows of material through the annular ducts 54 and 55 are combined in the region of their openings into the collecting duct 50 to form a pre-laminate which consists of two layers of material. The above-described configuration in which a common collecting duct 50 is disposed downstream of the two annular ducts 54 and 55 may be required for example if the cross-sectional area of the annular piston 26 is too small for all the annular ducts to be able to continue to the free end 28 of the piston. Another reason for such a configuration may be to avoid the pre-laminate which is formed in the collecting duct 50 having a confluence seam which extends through the pre-laminate, being formed at the location at which the two sub-flows of material which flow in the circumferential direction through the respective distributor ducts 44 and 45 come together and combine to form a closed ring. That location is generally displaced through 180° relative to the respective feed duct in the circumferential direction. In that case, that is to say when forming a pre-laminate to prevent the formation of a confluence seam of that kind however, the two feed ducts 34 and 35 for supplying the two flows of material for forming the pre-laminate are displaced relative to each other in the circumferential direction so that the seams which are formed in the flows of material are also displaced somewhat relative to each other in the circumferential direction. The sub-flows of material flowing in the circumferential direction are indicated by arrows in FIGS. 2 and 3.

The flow of material which is supplied by the feed duct 37 on the other hand is divided into two sub-flows which are each passed through the connecting ducts 37a and 37b to respective ones of the annular distributor ducts 47a and 47b, thus giving rise to two flows of material so that the final laminate has at least two layers which consist of the same material and come from one extruder.

All the annular ducts 52, 53, 57b, 56, 57a and 50 which open into the storage chamber 30 are provided with end portions as indicated at 62, 63, 67b, 66, 67a and 60, as can be more clearly seen from FIG. 4, which are of a conically enlarging configuration in the direction of flow of the plastic material which flows through the individual duct systems. The separating wall portions provided in the annular piston structure between the above-mentioned annular ducts are correspondingly reduced in thickness in the direction of flow of the material through the piston. That serves on the one hand to reduce the rate of flow of the individual flows of material in the above-indicated end portions 62, 63, 67b, 66, 67a and 60. On the other hand, in that way the individual flows of material, as they flow through the conically enlarging end portions, are already brought more closely towards each other so that when they pass through the respective outlets indicated at 72, 73, 77b, 76, 77a and 70 at the free end face 28 of the annular piston 26, which face is essentially defined by the end faces of the wall portions defining the individual annular ducts, the individual flows of material readily combine within the storage chamber 30 to form the final laminate structure. The final laminate-formation location is thus within the storage chamber 30 but immediately adjoining the outlets 72, 73, 77b, 76, 77a and 70 of the annular ducts or the end portions thereof at the end face 28 of the annular piston 26 which, in the operation of forming the laminate, under the effect of the laminate filling the storage chamber 30, is displaced upwardly until reaching the limit position shown in FIGS. 1 and 4. In that connection it is generally not necessary to close the extrusion opening 16 as the resistance which the annular piston 26 opposes by virtue of its actuating means 25 and 27 to the laminate filling the storage chamber 30 is normally less than the flow resistance presented by the extrusion opening 16.

FIG. 4 shows that the individual flows of material, at the time at which they pass through the outlets 72, 73, 77b, 76, 77a and 70 at the end face 28 of the annular piston, fill the entire width, that is to say the whole of the radial extent, of the storage chamber 30. That means that, at the moment at which the laminate is formed, that is to say when the individual flows of material come together and combine to form the final laminate structure, only minor transverse movements are required on the part of the individual flows of material for them to come into contact with each other and thus combine to form the laminate structure. That is also advantageous in regard to uniformity of the laminate-formation operation and accordingly the laminate which is produced in that situation, especially as, during the storage operation, the laminate remains substantially immobile within the chamber 30 and thus during the laminate-formation operation, the movement of the flows of material for forming the individual layers of the laminate structure is restricted to the movement which occurs predominantly in the axial direction within the annular piston and the speed of which is in any case comparatively low, having regard to the conical enlargement configuration of the end portions 62, 63, 67b, 66, 67a and 60, as described above.

As soon as the annular piston 26, during the operation of filling of the chamber 30, has reached its upper limit position as shown in FIGS. 1 and 4, in which the chamber 30 is thus filled with the final laminate, the piston 25 of the piston-cylinder unit or units 25, 27 is actuated in the appropriate manner to displace the annular piston 26 towards the extrusion opening 16. In the course of that movement, the laminate stored in the storage chamber 30 is simultaneously displaced towards the extrusion opening 16 until the annular piston 26 has reached its lower limit position as shown in FIG. 5. Before passing through the extrusion opening 16, the laminate structure is essentially subjected to a reduction in its radial extent as the width of the annular passage 18 leading to the extrusion opening 16 is less than the width of the storage chamber 30. It has been found however that the progressive reduction in thickness of the laminate which is produced in that way is substantially more advantageous than a change between reducing and increasing the laminate thickness or vice-versa.

In the embodiment shown in FIGS. 1 through 5, the end portions 62, 63, 67b, 66, 67a and 60 of the annular ducts 52, 53, 57b, 56, 57a and 50 are of a conically enlarging configuration in the direction of flow of the material therethrough, in such a way that, in the plane in which the outlets 72, 73, 77b, 76, 77a and 70 are disposed, that is to say in the plane of the end face 28 of the annular piston 26 in the illustrated embodiment, the radial extent of the individual end portions referred to above is proportional to the thickness of the individual layers which originate from the flows of material issuing from the outlets 72, 73, 77b, 76, 77a and 70 and which form the final laminate structure which is stored in the chamber 30. Those layers are indicated at references 82, 83, 87b, 86, 87a and 80 in FIG. 4 of the drawing. The above-described relative width of the outlets 72, 73, 77b, 76, 77a and 70 means that the flows of material, at the moment of passing through the outlets, are moving at substantially equal rates so that, at the moment at which the laminate is formed, which is achieved by virtue of the annular piston 26 being moved away from the extrusion opening 16 as the storage chamber 30 is progressively filled, there are no noticeable differences in the rate of flow as between the individual flows of material. In addition, as already mentioned above, the arrangement of the apparatus is such that the flows of material passing through the outlets extend overall over almost the entire width of the storage chamber 30 so that there is no need for noticeable transverse movements of the flows of material for forming the layers 82, 83, 87b, 86, 87a and 80, in order for them to combine together to form the laminate.

Moreover there is also no need for the free end 28 of the annular piston 26 to be of such a configuration that the ends of all the separating wall portions therein are disposed in one plane which is normal to the longitudinal axis of the extrusion head. In this connection it would be possible to take account of conditions arising out of considerations relating to the necessary mechanical strength of the annular piston and the individual parts thereof, although the annular piston is guided with its outer and inner circumferential walls bearing against the housing 10 and the mandrel 12 respectively, so that the most outwardly disposed wall portions of the annular piston, which are subjected on one side to the pressure of the flows of plastic material passing through the outer duct system 32, 42, 52 and 62 and the inner duct system 35, 45, 55 and 50 respectively suffer wear by virtue of bearing against the housing 10 and the mandrel 12 respectively.

In other respects the above-described extrusion head operates in the usual manner, that is to say after the emptying stroke movement of the annular piston 26, in the course of which the annular piston 26 is axially displaced from the position shown in FIG. 4 into the position shown in FIG. 5, the material issuing from the outlets of the annular piston 26 displaces same upwardly into its initial position shown in FIG. 4, while at the same itme the chamber 30 is filled with the laminate. Generally the procedure is such that the extruders from which the flows of material are passed into the extrusion head will continue to operate during the emptying stroke movement of the annular piston 26, so that the apparatus operates in a continuous fashion.

Figure 6:
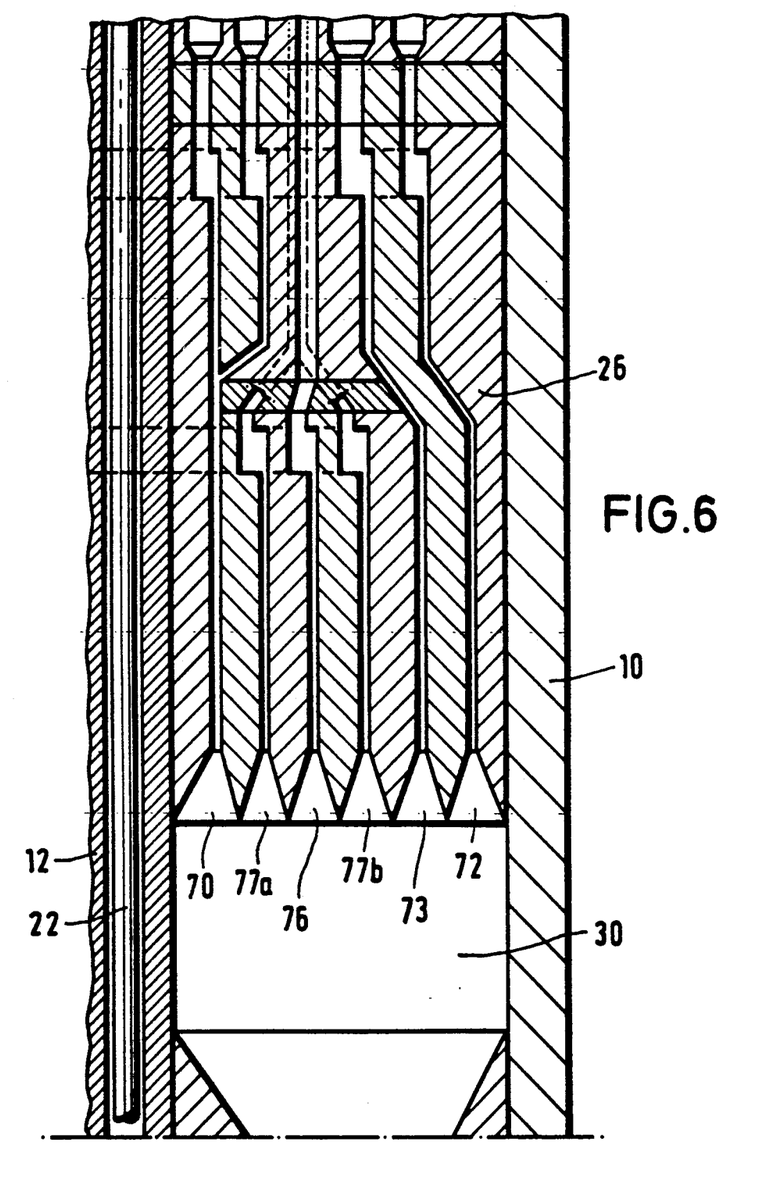
FIG. 6 is a view corresponding to that shown in FIG. 4 of a second embodiment of the apparatus according to the invention.

Referring now to FIG. 6, shown therein is an embodiment of the apparatus in accordance with the invention which generally corresponds in all the essential details of its structural configuration and its mode of operation to the embodiment described above with reference to FIGS. 1 through 5 so that the same reference numerals are used to denote the same components. The only difference between the two embodiments is that, in the embodiment shown in FIG. 6, the outlets 72, 73, 77b, 76, 77a and 70 of the duct systems in the annular piston 26 are of substantially the same radial extent. Thus, when the final laminate which is to be formed within the storage chamber 30 comprises layers of different widths, the individual flows of material issuing from those outlets would flow therefrom at different flow rates to produce the different thicknesses of the layers in question. The embodiment shown in FIG. 6 can be used when the differences in regard to the thicknesses of the individual layers of the laminate structure are not excessively great and/or the absolute rates of flow at which the flows of material pass through the outlets are so low that the differences in flow rate are not very crucial. The piston shown in FIG. 6 has the advantage that it is of a somewhat simpler design configuration than the piston of the embodiment shown in FIGS. 1 through 5.

It will be appreciated that the above-described apparatus and process for the production of hollow bodies from thermoplastic material have been set forth solely by way of example and illustration of the teachings of the present invention and that various other modifications and alterations may be made therein without thereby departing from the spirit and scope of the invention.

What is claimed is:

1. In a process for producing hollow bodies from thermoplastic material, the wall of which is in the form of a laminate including a plurality of interconnected layers of at least two plastic materials of different nature, by means of extrusion blow molding, the step of producing tubular preforms whose wall comprises a corresponding number of layers in an intermittent mode of operation using an extrusion unit including at least first and second extruders extruding the at least two plastic materials and a common extrusion head which is connected to the first and second extruders and which includes an annular storage chamber for receiving a preform laminate, an annular piston positioned for reciprocation in at least part of the storage chamber for emptying the storage chamber and an extrusion opening on a side of the storage chamber opposite the annular piston and through which the preform laminate is extruded by the annular piston emptying the chamber to form the tubular preforms, wherein all flows of the plastic materials which pass into the extrusion head for forming the individual layers of the laminate pass into and are guided through the annular piston and are each put therein into an annular cross-sectional shape, and wherein at least a plurality of flows of different material leave the annular piston at its side facing towards the extrusion opening flowing individually out of an end face of the annular piston directly into the storage chamber and combine in the storage chamber only after flowing separately beyond the end face of the piston to form the preform laminate.

2. A process as set forth in claim 1 wherein the totality of the flows of material leaving the annular piston at its side towards the extrusion opening of the extrusion head, upon passing beyond the piston end face into the storage chamber, is of a radial extent which at least approximately corresponds to the radial extent of the storage chamber.

3. A process as set forth in claim 1 wherein the plurality of individual annular flows of material which leave the annular piston at its side towards the extrusion opening and which are combined to form the preform laminate in the storage chamber, leave the annular piston with a thickness which is substantially proportional to the thickness of the layers respectively formed from said flows of material in the laminate to be stored in the storage chamber.

4. A process as set forth in claim 3 wherein just before leaving the end face of the annular piston the individual flows of material are brought to thicknesses which are substantially proportional to the thickness of the respective layers formed from said flows of material in the preform laminate.

5. A process as set forth in claim 1 wherein at least first and second flows of material are combined in the annular piston to provide a pre-laminate which is of annular cross-section and which leaves the annular piston as a combined flow at the end face.

6. Apparatus for producing hollow bodies from plastic material comprising a wall in the form of a laminate formed by a plurality of interconnected layers of at least first and second plastic materials of different natures by means of extrusion blow molding, said apparatus comprising an extrusion unit including at least first and second extruders extruding the at least first and second different plastic materials and a common extrusion head which is connected to the first and second extruders and which includes a storage chamber for receiving a preform laminate, an annular piston positioned for reciprocating in at least part of the storage chamber for emptying of the storage chamber and an annular extrusion opening on a side of the storage chamber opposite the piston for extrusion of the preform laminate by the annular piston during the emptying of the storage chamber, wherein the annular piston has therewithin a plurality of duct systems comprising feed ducts for receiving flows of the plastic materials from the at least first and second extruders, distributor ducts which communicate with the respective feed ducts and in which the respective flows of material are put into a plurality of flows of annular cross-sectional configuration, and a plurality of annular outlets which communicate with the respective distributor ducts, each outlet being located at an end face of the annular piston which faces towards the extrusion opening, the outlets at said end face of the annular piston opening separately from each other directly into the storage chamber whereby at least a plurality of separate annular flows pass through the outlets and combine in the storage chamber only after flowing beyond the end face of the piston to form the preform laminate.

7. Apparatus as set forth in claim 6 wherein the number of said feed ducts is the same as the number of said outlets.

8. Apparatus as set forth in claim 6 wherein the radial extent of the region of said end face of the annular piston within which the outlets are arranged at said end face, at least approximately corresponds to the radial width of the storage chamber.

9. Apparatus as set forth in claim 8 further comprising an annular duct between each annular outlet and at least one distribution duct and wherein at least a part of the annular ducts opening into the storage chamber is conically enlarged in the direction of flow upstream of the respective outlet.

10. Apparatus as set forth in claim 8 wherein the sum of the radial widths of the end portions of the annular ducts at their respective outlets is at least approximately equal to the radial width of the storage chamber.

11. Apparatus as set forth in claim 6 wherein the individual outlets, in the region of the piston end face where they open into the storage chamber, are of a width which is at least substantially proportional to the thickness of the respective layers in the preform laminate which are formed from the respective flows of material leaving the outlets.

12. A process for producing a tubular preform for a hollow body having a wall in the form of a laminate formed by a plurality of interconnected layers of at least two plastic materials of different natures by means of extrusion blow molding, wherein: a plurality of flows of plastic materials which corresponds in number to the number of layers to make up the laminate structure is extruded; the plurality of flows of materials are introduced into a first side of a common extrusion head including a housing, an annular piston receiving the plurality of flows and displaceable in the housing, the piston having duct systems extending therethrough, an annular storage chamber disposed at a side of the annular piston remote from the first side at which said flows of material are introduced into the extrusion head for receiving flows of the materials from the piston, and an extrusion opening communicating with the storage chamber on a side of the chamber remote from the piston, for extrusion of the preform laminate in the storage chamber by the piston to form the tubular preform; all said flows of material are passed through said duct systems in said annular piston, said duct systems being adapted to put said flows into respective annular cross-sectional shape; and said flows of material of annular cross-sectional shapes which leave the duct system of the annular piston at its end face facing towards said storage chamber flow individually out of the end face of the annular piston directly into the storage chamber and combine in the storage chamber to form the preform laminate structure only after flowing separately beyond the end face of the piston into the storage chamber.

* * * * *

UNITED STATES PATENT AND TRADEMARK OFFICE
CERTIFICATE OF CORRECTION

PATENT NO.   : 5,004,578
DATED        : April 2, 1991
INVENTOR(S)  : Otto Eiselen It is certified that error appears in the above-identified patent and that said Letters Patent is hereby corrected as shown below:

On the title page item [73] Assignee:

Delete "Drupp" and insert therefor "Krupp".

Signed and Sealed this

Twenty-eighth Day of July, 1992

Attest:

DOUGLAS B. COMER

*Attesting Officer*   Acting Commissioner of Patents and Trademarks